United States Patent
Ohgushi et al.

(10) Patent No.: US 10,095,225 B2
(45) Date of Patent: Oct. 9, 2018

(54) QUALITY CONTROLLING DEVICE AND CONTROL METHOD THEREOF

(71) Applicant: KABUSHIKI KAISHA TOSHIBA, Tokyo (JP)

(72) Inventors: Toshiaki Ohgushi, Kanagawa (JP); Takeichiro Nishikawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 391 days.

(21) Appl. No.: 14/854,719

(22) Filed: Sep. 15, 2015

(65) Prior Publication Data

US 2016/0077520 A1 Mar. 17, 2016

(30) Foreign Application Priority Data

Sep. 17, 2014 (JP) ................................ 2014-189359

(51) Int. Cl.
*G06F 19/00* (2018.01)
*G05B 19/418* (2006.01)

(52) U.S. Cl.
CPC ............. *G05B 19/41875* (2013.01); *G05B 2219/32194* (2013.01); *Y02P 90/22* (2015.11); *Y02P 90/86* (2015.11)

(58) Field of Classification Search
CPC .... G05B 19/41875; G05B 2219/32194; Y02P 90/22; Y02P 90/86
USPC ...................................................... 700/109
See application file for complete search history.

(56) References Cited

U.S. PATENT DOCUMENTS

| | | | |
|---|---|---|---|
| 7,070,486 B2 | 7/2006 | Doi et al. | |
| 7,702,413 B2 | 4/2010 | Ushiku et al. | |
| 8,131,020 B2 * | 3/2012 | Macgregor | .......... G05B 13/048 382/110 |
| 2005/0288812 A1 | 12/2005 | Cheng et al. | |
| 2015/0269120 A1 | 9/2015 | Nakatsugawa et al. | |

FOREIGN PATENT DOCUMENTS

| | | |
|---|---|---|
| JP | 2006-24195 | 1/2006 |
| JP | 2006-157029 | 6/2006 |
| JP | 2007-242809 | 9/2007 |
| JP | 2009-211589 | 9/2009 |
| JP | 2012-226511 | 11/2012 |

(Continued)

*Primary Examiner* — Huan Hoang
(74) *Attorney, Agent, or Firm* — Finnegan, Henderson, Farabow, Garrett & Dunner, L.L.P.

(57) ABSTRACT

According to one embodiment, there is provided a quality controlling device including: a predictor, a frequency calculator, and an implementing signal creator. The predictor employs a prediction model that associates an inspection result value of a first inspection with a predicted value being a value relating to a possibility of pass or failure in a second inspection and calculates the predicted value from an inspection result value that is obtained for an inspection target in the first inspection. The frequency calculator calculates, for the inspection target, an implementation frequency to implement the second inspection in accordance with the predicted value calculated by the predictor. The implementing signal creator creates a signal that indicates, for the inspection target, necessity of implementing the second inspection in accordance with the implementation frequency.

11 Claims, 11 Drawing Sheets

(56) References Cited

FOREIGN PATENT DOCUMENTS

| JP | 2013-15964 | 1/2013 |
|----|------------|--------|
| JP | 5167596 | 3/2013 |
| JP | 2013-084057 | 5/2013 |
| JP | 2015-184823 | 10/2015 |

\* cited by examiner

QUALITY CONTROLLING DEVICE AND CONTROL METHOD THEREOF

CROSS-REFERENCE TO RELATED APPLICATIONS

This application is based upon and claims the benefit of priority from Japanese Patent Application No. 2014-189359, filed Sep. 17, 2014; the entire contents of which are incorporated herein by reference.

FIELD

Embodiments described herein relate to a quality controlling device and a control method thereof.

BACKGROUND

Hard disk drives (HDDs) used as storages for computers are inspected before shipment by various methods to ensure high quality. No little inspecting methods cost very much, such as an operation inspection in a low-temperature environment that requires a dedicated facility.

To prevent the cost of inspection to increase, there may be used a model to predict the possibility of pass or failure in advance. If a prediction model yields a prediction result on a product that the product is highly likely found passed or failed, it is determined that a high-cost inspection of the product is unnecessary to implement, and another, low-cost inspection is implemented instead of the high-cost inspection. This method makes it possible to reduce the number of targets to be subjected to the high-cost inspection while ensuring quality.

For the prediction model, parameters (prediction parameters) used for the prediction matters. This is because the prediction parameters closer to optimum values bring an improved accuracy of the prediction. However, to bring the prediction parameters closer to the optimum value, a large number of predictions and inspection results are needed, entailing a high cost.

In addition, as to HDDs, it is often the case where configuration conditions such as design values and members are modified even in the same type. In this case, using a prediction model corresponding to a configuration before the modification results in the reduction of prediction accuracy. This is because the modification of the configuration conditions causes the optimum values of the prediction parameters to be changed. Therefore, after the modification of the configuration conditions, it is necessary to update the prediction parameters early enough. It is however required to implement a high-cost inspection therefor, involving a problem of increasing cost.

DETAILED DESCRIPTION

According to one embodiment, there is provided a quality controlling device including: a predictor, a frequency calculator, and an implementing signal creator. The predictor employs a prediction model that associates an inspection result value of a first inspection with a predicted value being a value relating to a possibility of pass or failure in a second inspection and calculates the predicted value from an inspection result value that is obtained for an inspection target in the first inspection. The frequency calculator calculates, for the inspection target, an implementation frequency to implement the second inspection in accordance with the predicted value calculated by the predictor. The implementing signal creator creates a signal that indicates, for the inspection target, necessity of implementing the second inspection in accordance with the implementation frequency.

Hereinafter, embodiments will be described below with reference to the drawings.

Figure 1:
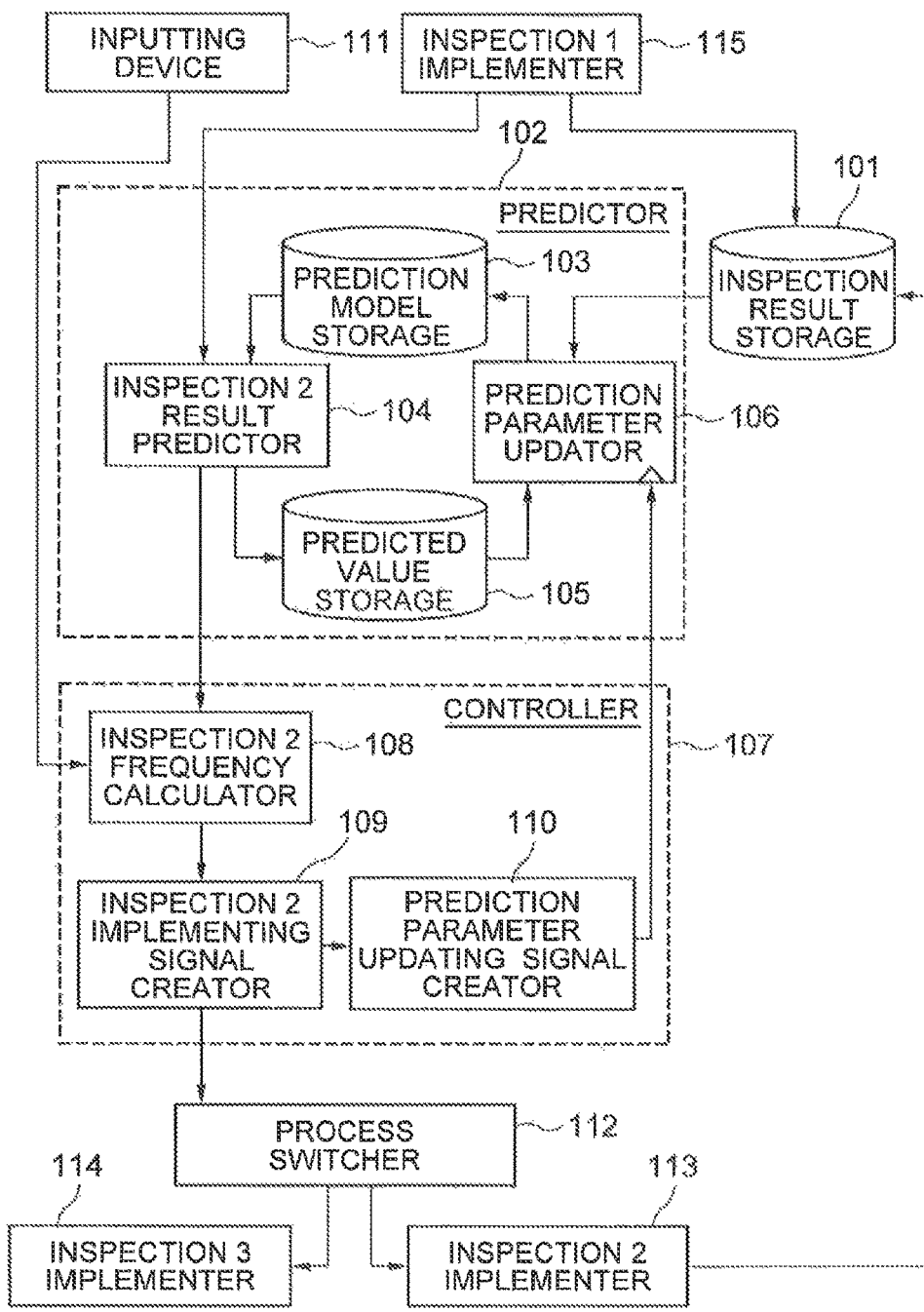
FIG. 1 is a block diagram in one embodiment of the present invention.

FIG. 1 shows a quality control system that includes quality controlling device in one embodiment of the present invention.

This quality control system is formed by an inspection result storage 101, a predictor 102, a controller 107, an inputting device 111, a process switcher 112, an inspection 1 implementer 115, an inspection 2 implementer 113, and an inspection 3 implementer 114.

In one embodiment of the present invention, three inspections, an inspection 1, an inspection 2, and an inspection 3, are implemented.

The inspection 1 is an inspection that is implemented in advance to judge whether to implement the inspection 2. The inspection 1 is implemented by the inspection 1 implementer 115.

The inspection 2 is an inspection that highly costs, and conceivable examples thereof include an inspection that requires a dedicated facility that creates a severe environment such as at high or low temperatures, an inspection that takes a long time to the test thereon. The inspection 2 is implemented by the inspection 2 implementer 113.

The inspection 3 is an inspection that costs lower than the inspection 2. Conceivable examples of the inspection 3 include an inspection that can be implemented at room temperature, and the like. The inspection 3 is implemented by the inspection 3 implementer 114. A configuration without the inspection 3 is also possible, in which case the inspection 3 implementer 114 is unnecessary.

In each inspection, an inspection including one or more inspection items is implemented. In the case where an inspection target is an HDD, conceivable inspection items include a read/write error rate measurement, servo stability, and an amplifier gain measurement but are not limited to them.

Among the inspections, some or all of the inspection items may be the same. The inspection 1 and the inspection 3 may include the same inspection items whereas the inspection 3 may be an inspection under a condition more strict than the inspection 1. For example, the test thereon may be performed by imposing a load on an inspection target with a supply voltage thereto, or may be performed a lowered acceptable number of read/write errors, a lowered acceptable amount of servo error, or the like (more strict test conditions). Note that the number of inspection items in each inspection is not necessarily the same.

The kinds of cost may be defined, such as an expense and time to implement the inspection. In addition, a criterion to determine whether the cost is high or low is optional.

An inspection result value represents an inspection result in the form of a numerical value. When an inspection item is an error rate measurement, it is conceivable to use an error rate value or a label value to classify the error rate value. The same is true for the other inspection items.

The evaluation value represents, in the form of a numerical value, the judgment result of pass or failure that is judged based on the inspection result value of the inspection 2. For example, the evaluation value can represent pass as zero and failure as one.

That is, the evaluation value is a binary value of zero or one. The judgment of pass or failure may be made by a user from the inspection result value of each inspection item of the inspection 2, or may be automatically made in accordance with whether a judgment reference value that is predetermined for each inspection item is met. In addition, the judgment may be made for each inspection item or collectively from the inspection result values of an inspection item group of an inspection. For example, if the inspection result value of at least one given item out of one or more given items is more than or equal to a threshold value, the judgment of failure may be made. The determination may be made by methods other than those described here.

The predictor 102 is a part that calculates, from the inspection result value of the inspection 1, a predicted value being a value relating to the possibility of pass or failure in the inspection 2, for a product being a prediction target. The predicted value is calculated for each inspection item of the inspection 2. Note that the number of inspection items to be predicted may be one.

The predicting calculation is calculated based on a prediction model. The prediction model is a model that associates the inspection result value and prediction parameter of the inspection 1 with a predicted value that is a value relating to the possibility of pass or failure in the inspection 2. The prediction parameter is calculated in advance. It is therefore possible, on the basis of this prediction model, to calculate a predicted value, which is a value relating to the possibility of pass or failure, from the inspection result value of the inspection 1. The prediction model may be provided for each inspection item of the inspection 2.

Such a prediction model can be created by analyzing past inspection result values of the inspection 1 and past evaluation values of the inspection 2. Examples of the prediction model include a regression model, a neural network, and a support vector machine. Note that the evaluation value is obtained here by making the judgment of pass or failure for each inspection item of the inspection 2, but the evaluation value can be obtained by making the judgment of pass or failure collectively from the inspection result values of a plurality of inspection items of the inspection 2.

In this case, one prediction model exists for all the plurality of inspection items of the inspection 2.

The controller 107 is a part that controls the implement of the inspection 2. The controller 107 determines the frequency of implementing the inspection 2 and the necessity thereof and outputs a signal to give an instruction of implementing the inspection 2 to the process switcher 112 if the inspection 2 is to be implemented on an inspection target. If the inspection 3 is to be implemented, the controller 107 outputs a signal to give an instruction of implementing the inspection 3 to the process switcher 112.

The inspection result storage 101 is a device to store the inspection result value of the inspection 1, and the inspection result value and evaluation value of the inspection 2 together with information on an inspected product. The information on the product may include the manufacturer of a component used by the product, the gain of an amplifier that reads data, a control setting value such as a flying height of a reading head relative to a storage medium, a place of production, a situation in assembling, and the like.

Here, in the case where the inspection 1 includes a plurality of inspection items, an inspection result value r1 of the inspection 1 implemented by the inspection 1 implementer 115 is a set containing a plurality of inspection result values. When the inspection 1 includes a number j of inspection items in total, where j is an integer more than zero, r1 is expressed as follows.

$$r1 = \{r1_1, r1_2, \ldots, r1_j\}$$

Similarly, in the case where the inspection 2 includes a plurality of inspection items, an evaluation value based on the inspection result value of the inspection 2 implemented by the inspection 2 implementer 113 and the inspection result value thereof is also a set containing a plurality of values. Here, when the evaluation value of the inspection 2 is denoted by r2, in the case where the inspection 2 includes a number k of inspection items in total, where k is an integer more than zero, the evaluation value r2 is expressed as follows. Note that j and k may be either the same or different from each other. The evaluation value is expressed by, for example, a binary value that takes on zero for pass or one for failure.

$$r2 = \{r2_1, r2_2, \ldots, r2_k\}$$

The inspection result storage 101 associates the inspection result value r1 and the evaluation value r2 with the ID of an inspected product. When a number of i of products have been inspected thus far, where i is an integer more than zero, and R1 represents the inspection result of the inspection 1 for all the products and R2 represents the evaluation value of the inspection 2 for all the products, the inspection result value R1 and the evaluation value R2 are expressed as follows.

$$R1 = \begin{pmatrix} r1_{11} & r2_{12} & \ldots & \ldots & r1_{1j} \\ r1_{21} & r1_{22} & \ldots & \ldots & r1_{2j} \\ \ldots & \ldots & \ldots & \ldots & \ldots \\ \ldots & \ldots & \ldots & \ldots & \ldots \\ r1_{i1} & r1_{i2} & \ldots & \ldots & r1_{ij} \end{pmatrix} \quad \text{[Expression 1]}$$

$$R2 = \begin{pmatrix} r2_{11} & r2_{12} & \ldots & \ldots & r2_{1k} \\ r2_{21} & r2_{22} & \ldots & \ldots & r2_{2k} \\ \ldots & \ldots & \ldots & \ldots & \ldots \\ \ldots & \ldots & \ldots & \ldots & \ldots \\ r2_{i1} & r2_{i2} & \ldots & \ldots & r2_{ik} \end{pmatrix}$$ [Expression 2]

Each row in the matrices corresponds to each inspected product. In addition, each column in the matrices represents each inspection item.

The parameters "j" and "k" in the matrices represent the numbers of inspection items that form the inspection 1 and the inspection 2, respectively.

Note that if the inspection result storage has a limit in capacitance, data items during a certain period of time or on a certain number of devices may be held, and the data items may be deleted in an older order and the correspondence between a product ID and i may be updated.

The inputting device 111 is a device to input that is information necessary to determine the frequency or necessity of implementing the inspection 2.

The process switcher 112 outputs a signal to give an instruction of implementing an inspection to the inspection 2 implementer 113 or the inspection 3 implementer 114 in response to a signal output from the controller 107.

The inspection 1 implementer 115, the inspection 2 implementer 113, and the inspection 3 implementer 114 are, as mentioned above, equipment to implement the inspection 1, the inspection 2, and the inspection 3, respectively.

Figure 2:
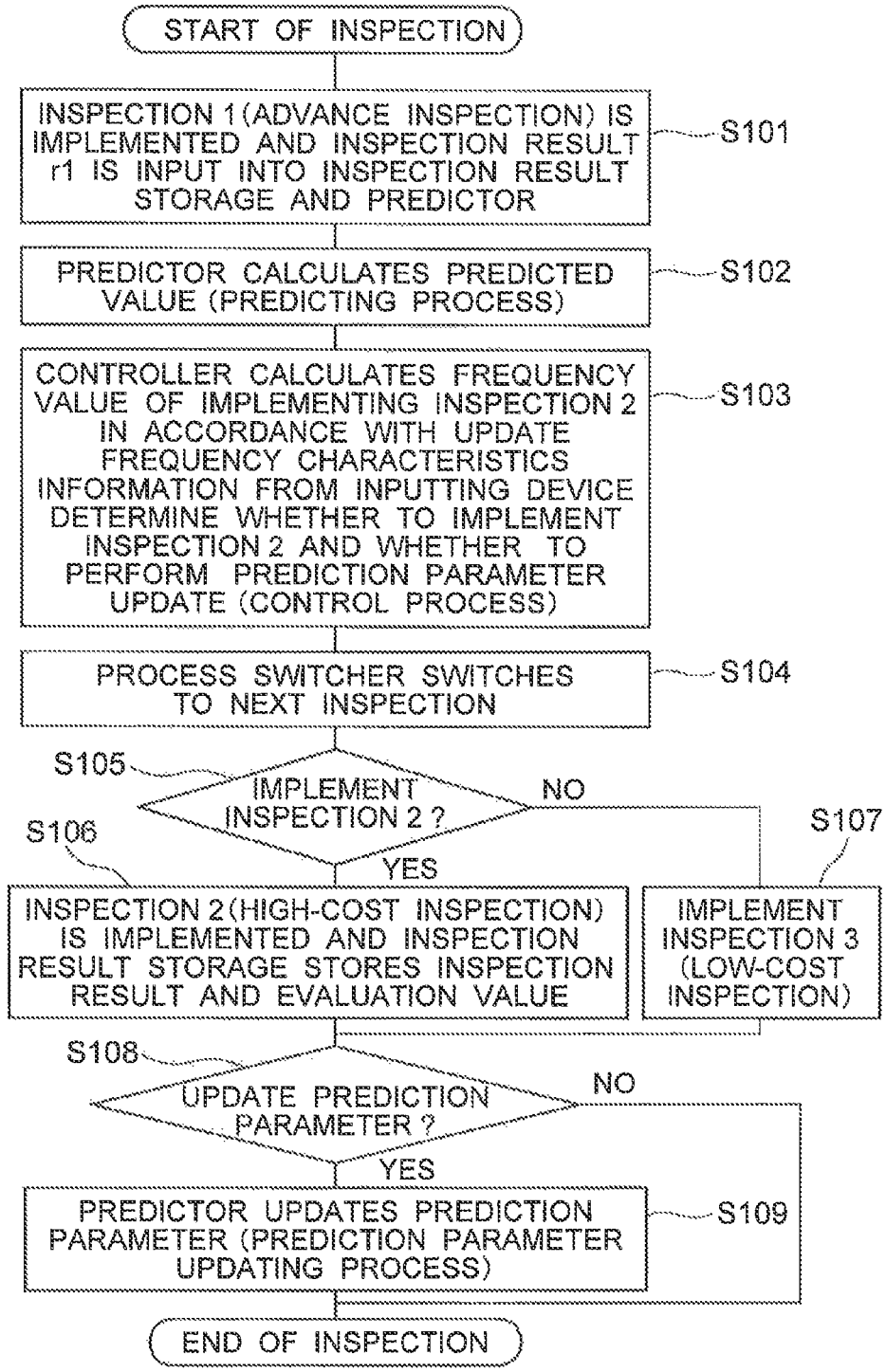
FIG. 2 is a flow chart of a process in the embodiment shown in FIG. 1.

FIG. 2 shows a flow chart of a process in one embodiment of the present invention, with reference to which the specific operation thereof will be described.

The inspection result storage 101 stores the inspection result value r1 of the inspection 1 that is implemented by the inspection 1 implementer 115 (S101).

The predictor 102 includes a prediction model storage 103, an inspection 2 result predictor 104, a predicted value storage 105, and a prediction parameter updator 106.

The predictor 102 calculates, from the inspection result value r1 of the inspection 1 that is implemented this time, a predicted value p2 that is a value relating to the possibility of pass or failure of an inspection target (S102). It is assumed here that the predicted value p2 is a value relating to the possibility of failure. In the case where pass is expressed by zero and failure is expressed by one, the predicted value p2 is a numerical value between 0 and 1, representing the probability of pass or failure.

When the inspection 2 includes a number k of inspection items in total, where k is an integer more than zero, the predicted value p2 is expressed as follows.

$$p2 = \{p2_1, p2_2, \ldots, p2_k\}$$

Figure 3:
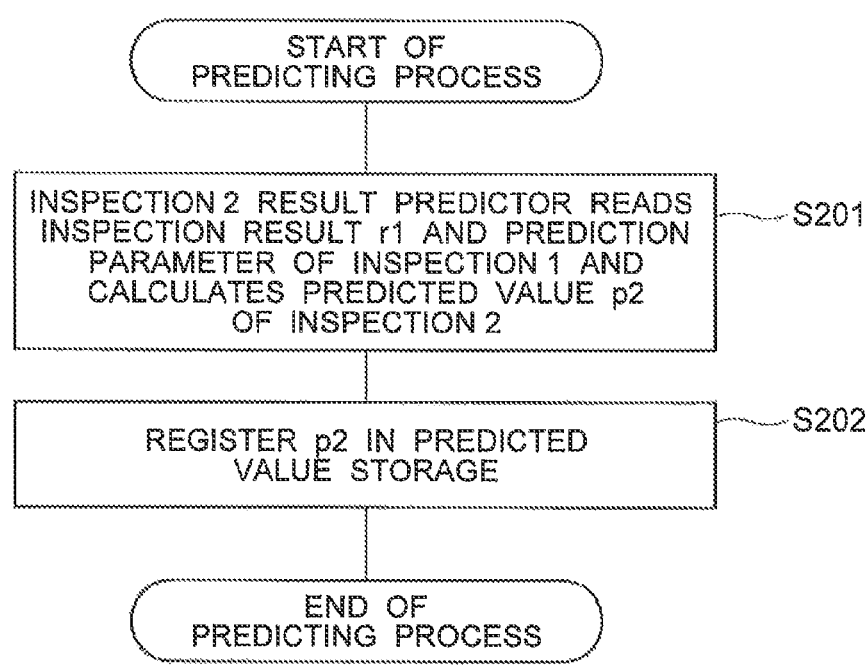
FIG. 3 is a flow chart of a predicting process in the embodiment shown in FIG. 1.

FIG. 3 shows a flow chart of a predicting process of calculating the predicted value p2, with reference to which the predicting process inside the predictor 102 will be described.

The prediction model storage 103 stores a prediction model that the inspection 2 result predictor 104 uses for prediction. The prediction model associates the inspection result value of the inspection 2, the prediction parameters, and a predicted value being a value relating to the possibility of pass or failure, depending on the type of the model. The type of a model means the form of a function that expresses the model such as a regression model, a neural network, a logit boost, and a support vector machine. Model information on a model may be stored in the prediction model storage 103 or may be embedded in a program to be executed by a processor. Note that, for the prediction parameter, an arbitrary value may be first registered as its the initial value and improved, or may be calculated by prediction parameter updator 106 in advance from a past inspection result.

The inspection 2 result predictor 104 reads the inspection result value r1 and the prediction parameters and calculates the predicted value p2 based on the prediction model (S201). For example, a regression model can be used as the prediction model.

Here, a predicted value P2 is defined as a value representing all the predicted values p2 for products that are stored in the predicted value storage 105. When the prediction has been made thus far on a number i of products, where i is an integer more than zero, the predicted value P2 is expressed as follows.

$$P2 = \begin{pmatrix} p2_{11} & p2_{12} & \ldots & \ldots & p2_{1k} \\ p2_{21} & p2_{22} & \ldots & \ldots & p2_{2k} \\ \ldots & \ldots & \ldots & \ldots & \ldots \\ \ldots & \ldots & \ldots & \ldots & \ldots \\ p2_{i1} & p2_{i2} & \ldots & \ldots & p2_{ik} \end{pmatrix}$$ [Expression 3]

The parameter "k" in the above expression represents the number of inspection items that forms the inspection 2.

Conceivable types of the regression model include a linear regression model, a multiple regression model, a logistic regression model, and the like. In addition, besides the regression model, prediction algorithms such as the above-mentioned neural network, logit boost, and support vector machine may be used.

As an example of the regression model, a logistic regression model will be described. In the case of a logistic regression model, when pass is expressed by zero and failure is expressed by one, a logistic regression equation yields a probability of failure. Now, when the result of the j:th inspection item in the inspection 1 for the i:th product is assigned to $r1_{ij}$, where j is an integer more than zero, a predicted value of the k:th inspection item in the inspection 2 is assigned to $p2_{ik}$, where k is an integer more than zero, and the prediction parameters are denoted by $a_{jk}$ and $b_k$, a predicted value $p2_{ik}$ is calculated by the following logistic regression equation. Note that the prediction parameters $a_{jk}$ and $b_k$ are calculated in advance by the prediction parameter updator 106.

$$p2_{ik} = \frac{1}{1 + \exp-(\sum_j a_{jk} r1_{ij} + b_k)}$$ [Expression 4]

Note that the portion put in parentheses in the above expression is called a logit value. The form of the above expression itself is equivalent to the type of a model.

The predicted value storage 105 stores the predicted value p2 that is newly calculated by the inspection 2 result predictor 104 (S202).

The predicting process inside the predictor 102 is thus completed.

The controller 107 includes an inspection 2 frequency calculator 108, an inspection 2 implementing signal creator 109, and a prediction parameter updating signal creator 110.

The controller 107 receives the predicted value p2 from the predictor 102 and update frequency characteristics information from the inputting device 111, and calculates an inspection 2 frequency value f2 that represents a frequency to implement the inspection 2 (S103).

The update frequency characteristics information and the inspection 2 frequency value will be described.

When the possibility that a prediction result comes true (the reliability of the prediction) is low in the prediction model, the inspection 2 should be implemented as much as possible. On the other hand, if the possibility that the prediction comes true is high, the number of implements of the inspection 2 should be decreased to reduce cost. Therefore, the frequency to implement the inspection 2 (the inspection 2 frequency value f2) may be determined in accordance with the probability that the prediction comes true (the reliability of the prediction). As a method for such determination, the update frequency characteristics information is used.

The update frequency characteristics information is a function that has the predicted value p2 as its input value and the inspection 2 frequency value f2 as its output value. This function may have a function shape such as a normal distribution, a rectangular function, a trapezoidal function, and a convex function, or the combination thereof. The function may differ for each inspection item of the inspection 2, in which case, a set of functions as many as the number of inspection items of the inspection 2 may be specified using the update frequency characteristics information.

Figure 4:
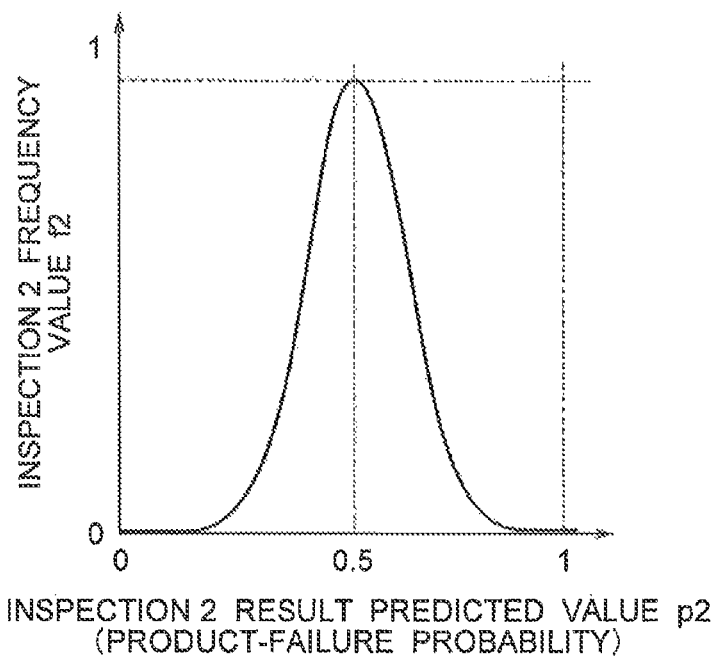
FIG. 4 is a relationship diagram between a predicted value and an inspection 2 frequency value in the case where update frequency characteristics information is a normal distribution.

FIG. 4 shows an example of an f2 calculation graph in the case of the above-described logistic regression model, as a specific example.

The predicted value p2 being the horizontal axis of FIG. 4 (in more detail, individual predicted values $p2_k$) is a numerical value between 0 and 1 in the case of this model, representing which of pass and failure the result of the prediction is closer to. The predicted value p2 being closer to 0 means a high reliability of prediction that a product will pass the inspection. In addition, p2 being closer to 1 means a high reliability of prediction that the product will fail the inspection. In contrast, the predicted value p2 near 0.5 indicates a state that the predictor 102 can make the prediction of neither pass nor failure, meaning that the reliability is low.

Therefore, a graph that has its peak at a p2 of 0.5 and declines as p2 comes closer to 0 or 1 is suitable for a graph to calculate an implementation frequency. Thus, a function of a normal distribution shown in FIG. 4 can be employed as the update frequency characteristics information.

Note that, for reference, when the reliability of the prediction $p2_k$ for the k:th inspection item in the inspection 2 in this model is denoted by $C2_k$, $C2_k$ can be expressed, for example, by the following example.

$$C2_k = 2(|p2_k - 0.5|)$$

In this case, the reliability of the inspection 2 as a whole can be express by the following expression.

$$C2 = \Pi_k C2_k \quad \text{[Expression 5]}$$

The update frequency characteristics information may be determined for purposes such as ease of implementation, learning efficiency, and prevention of overlooking a failure.

Figure 5:
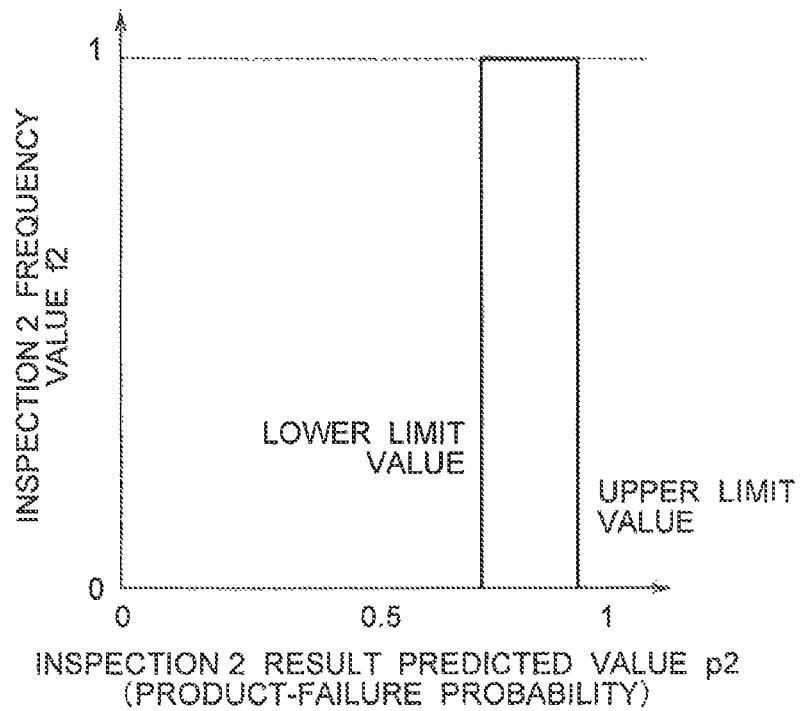
FIG. 5 is a relationship diagram between the predicted value and the inspection 2 frequency value in the case where update frequency characteristics information is a rectangular function.

FIG. 5 shows an f2 calculation graph in the case where a rectangular function is employed as the update frequency characteristics information. In this graph, f2 takes on a constant value when a predicted value exceeds a certain lower limit value. With this certain value set to 1, whenever the predicted value exceeds the certain lower limit value, the inspection 2 is always implemented (under a rule that the inspection 2 is implemented when a predicted value exceeds a certain lower limit value for even one of the plurality of inspection items of the inspection 2). Consequently, it is possible to intend to make improvements only within a certain range of a predicted value or to take countermeasures to always implement an inspection of a product that will highly likely fail the inspection.

Note that the update frequency characteristics information can be not only input from an external input device but also stored inside.

The controller 107 determines the necessity of implementing the inspection 2 and the necessity of updating the prediction parameters in accordance with the calculated frequency value f2 (S103).

Figure 6:
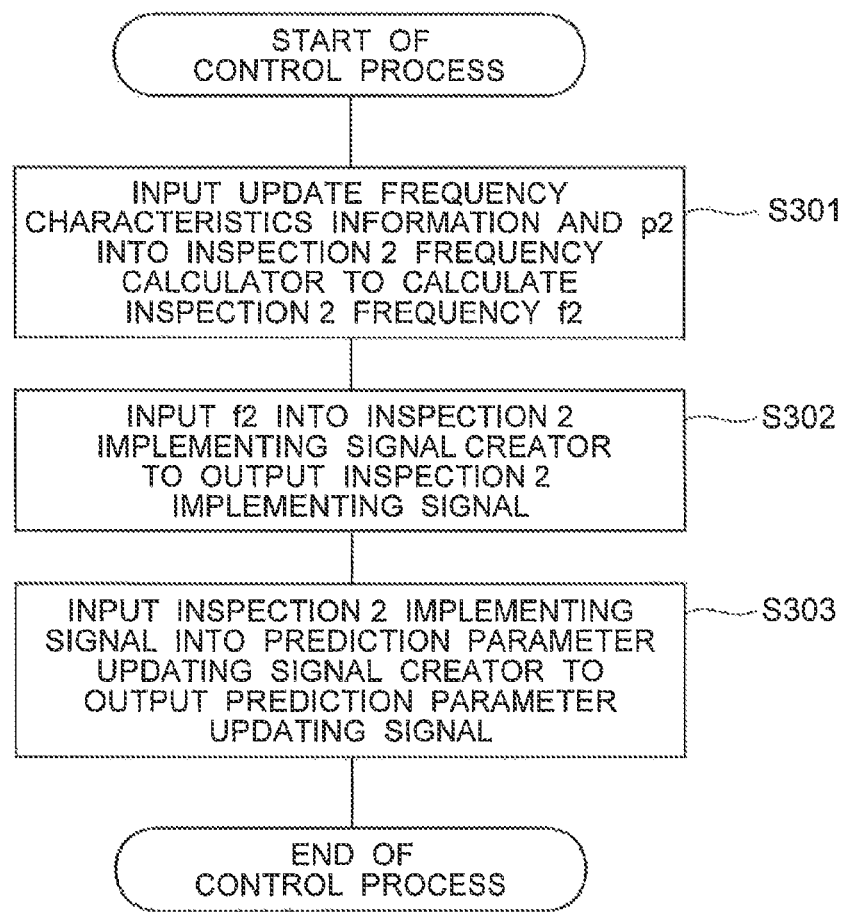
FIG. 6 is a flow chart of a control process in the embodiment shown in FIG. 1.

FIG. 6 shows a flow chart of a control process of calculating the frequency value f2, determining the necessity of implementing the inspection 2, and the necessity of a parameter updating process, and the control process inside the controller 107 will be described.

The inspection 2 frequency calculator 108 calculates the inspection 2 frequency value f2 from the update frequency characteristics information input from the inputting device 111 and the predicted value p2 input from the predictor 102 (S301). The details of this process are as described above.

The inspection 2 implementing signal creator 109 determines whether to implement the inspection 2 using a random number or the like to the frequency value f2 and outputs an inspection 2 implementing signal that indicates the necessity of implementing the inspection 2 (S302). For example, when the frequency value f2 is 0.7, the necessity of implementing the inspection 2 is determined using a random number or the like such that implementing the inspection 2 is determined with a probability of 70%. At this point, the necessity of implement is determined for each inspection item, and implementing the inspection 2 may be determined if only one of the inspection items is determined to be implemented, or may be determined if it is determined that a given item or a certain number of items are to be implemented.

The inspection 2 implementing signal s input into the prediction parameter updating signal creator 110 and the process switcher 112.

The prediction parameter updating signal creator 110 receives the inspection 2 implementing signal, determines whether to update the prediction parameters of a prediction model used by the inspection 2 result predictor 104 (a prediction model for each inspection item of the inspection 2, or one prediction model if the one prediction model is provided for all inspection items of the inspection 2. The case is assumed below where a prediction model is provided for each inspection item), and outputs a prediction parameter updating signal if determining the update of the prediction parameters (S303).

A conceivable method of determining whether to update the prediction parameters is a method in which the prediction parameter updating signal is output whenever, through past inspections, the number of times the inspection 2 implementing signal is turned ON exceeds a prescribed certain number. With this method, it is possible not to perform an updating process of the prediction parameters every time, which applies a load, but to collectively perform the updating process on every certain number of prediction parameters.

The control process inside the controller 107 is thus completed.

The process switcher 112 receives the inspection 2 implementing signal from the inspection 2 implementing signal creator and switches an inspection in the next process to the inspection 2 or the inspection 3 in accordance with the inspection 2 implementing signal (S104).

If the next process is the inspection 2 (YES in S105), the inspection 2 implementer 113 implements the inspection 2 on a target product. The inspection result value and the evaluation value r2 of each inspection item are stored in the inspection result storage 101 (S106). The evaluation value r2 is obtained by, as mentioned above, making a judgment based on the inspection result value for each inspection item.

If the next process s the inspection 3 (NO in S105), the inspection 3 implementer 114 implements the inspection 3 on the target product (inspection target) (S107).

If the predictor 102 receives the prediction parameter updating signal from the prediction parameter updating signal creator 110 (YES in S108), the predictor 102 performs the updating process of the prediction parameters under a prediction model for each inspection item of the inspection 2 (S109).

Figure 7:
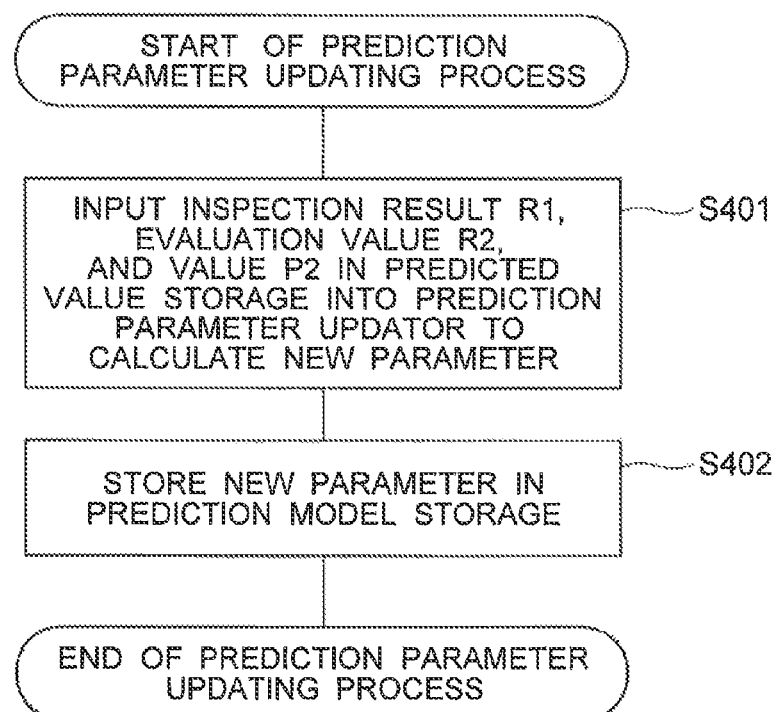
FIG. 7 is a flow chart of an updating process in the embodiment shown in FIG. 1.

FIG. 7 shows a flow chart of the updating process of the prediction parameters, with reference to which a prediction parameter updating process inside the predictor 102 will be described.

The prediction parameter updator 106 reads an inspection result value R1 and an evaluation value R2 stored in the inspection result storage 101, and a predicted value P2 stored in the predicted value storage 105, and calculates new prediction parameters (S401). As to the calculation of the prediction parameters, when the prediction model is a regression model, it is conceivable to perform an estimating method such as the least squares method or the maximum likelihood method. Note that some estimating methods dispense with reading all of these data items, and, for example, only the evaluation value R2 and the predicted value P2 may be read to perform the calculation.

As an example of calculating the prediction parameters, the maximum likelihood method in the case of the above-described logistic regression model will be described. In the above-described logistic regression model for the k:th inspection item of the inspection 2, a likelihood function $L_k$ that represents a likelihood of the regression model is expressed as follows using an evaluation value $r2_{jk}$ of the k:th inspection item of the inspection 2 performed on a product having an ID of i and a predicted value $p2_{jk}$ at that point.

$$L_k(a_{jk}, b_k) = \Pi_i f(r2_{ik}|a_{jk}, b_k) = \Pi_i p2_{ik}^{r2_{ik}}(1-p2_{ik})^{(1-r2_{ik})} \quad \text{[Expression 6]}$$

where "$r2_{ik}$" is the evaluation value of the k:th inspection item of the inspection 2, "$p2_{ik}$" is equivalent to the predicted value, and "$a_{jk}$" and "$b_k$" are equivalent to the prediction parameters.

It is known that a model being a base of the likelihood function becomes most reliable when the value of the likelihood function is its maximum value. Actually, in this prediction model, the predicted value becomes most reliable when the likelihood function reaches its maximum.

In this prediction model, the predicted value $p2_{ik}$ ranges $0 \leq p2_{ik} \leq 1$ since it is a probability, and the maximum value of the above likelihood function $L_k$ is 1 since $L_k$ also ranges $0 \leq L_k \leq 1$. Then, in the case where the evaluation value $r2_{ik}$ is 0, when the predicted value $p2_{ik}$ also comes closer to 0 that is the correct value of the prediction, the likelihood function $L_k$ comes closer to 1. Also in the case where the evaluation value $r2_{ik}$ is 1, if the predicted value $p2_{ik}$ also comes closer to 1 that is the correct value of the prediction, the likelihood function $L_k$ comes closer to 1. Therefore, $a_{jk}$ and $b_k$ that make the likelihood function reach its maximum are optimum prediction parameters.

The prediction parameter $a_{jk}$ and $b_k$ when the likelihood function reaches its maximum is calculated by differentiating, a logarithmic likelihood $LL_k$, which is a logarithm of the likelihood function with respect to the prediction parameters $a_{jk}$ and $b_k$ and calculating a value when the differential value becomes 0. Note that the differential value takes on 0 also at times other than when the likelihood function reaches its maximum.

$$LL_k(a_{jk}, b_k) = \sum_i r2_{ik} \log p2_{ik} + (1-r2_{ik}) + \log(1-p2_{ik}) \quad \text{[Expression 7]}$$

$$\frac{\partial LL_k}{\partial a_{jk}} = 0, \quad \text{[Expression 8]}$$

$$\frac{\partial LL_k}{\partial b_k} = 0$$

The differential value of the expression of the likelihood function may be derived by an iterated numerical calculation such as the Newton's method or the quasi-Newton method.

The calculated new prediction parameters are stored in the prediction model storage 103 and used as prediction parameters from the next prediction (S402).

The prediction parameter updating process inside the predictor 102 is thus completed.

As described above, according to the present embodiment, by using update frequency characteristics information that serves a purpose, it is possible to adjust a frequency to implement an inspection through prediction, reducing unnecessary inspection.

Figure 8:
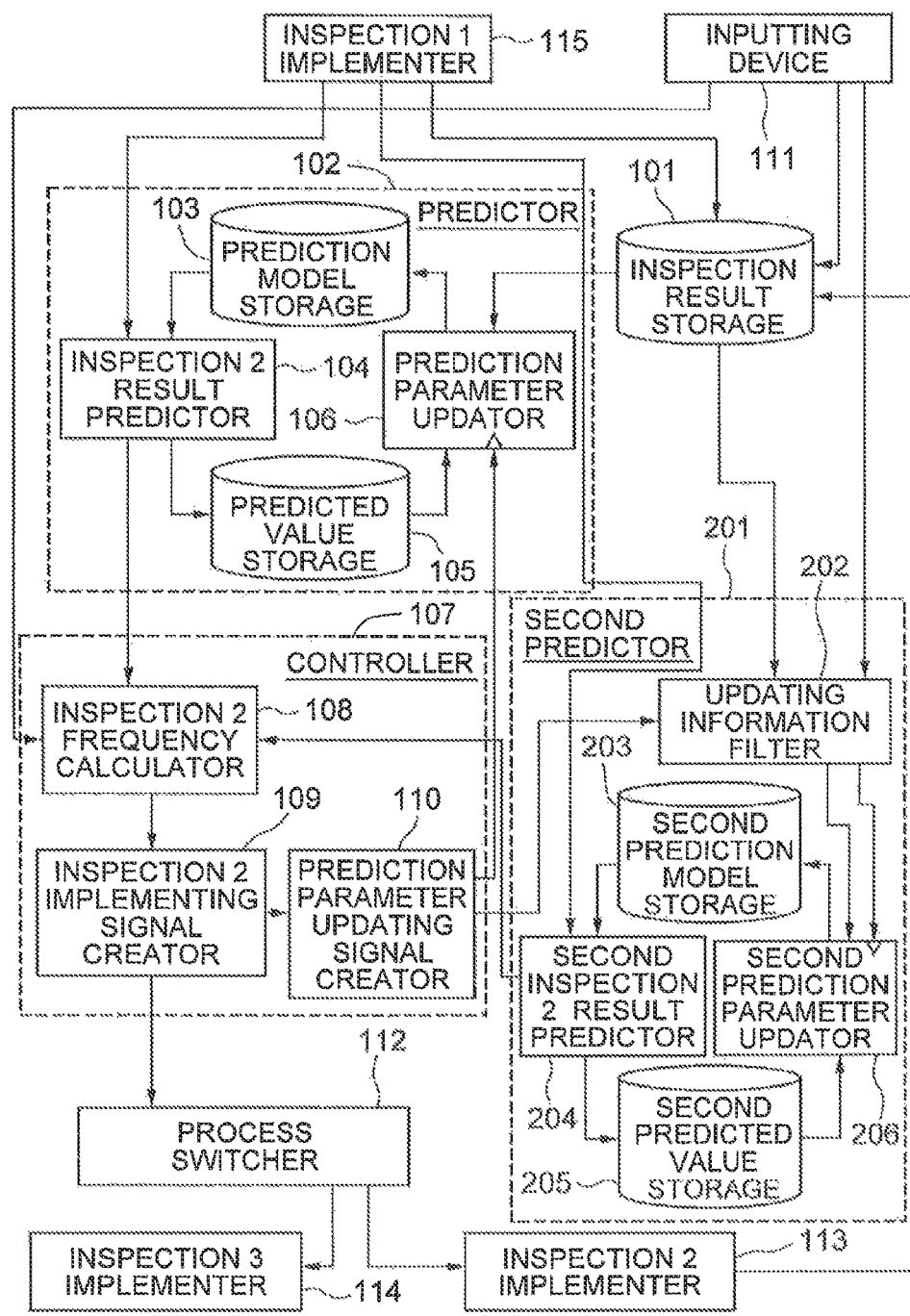
FIG. 8 a block diagram in a form in which a second predictor is added to the embodiment shown in FIG. 1.

FIG. 8 shows a block diagram in a second embodiment of the present invention. The second embodiment is a form in which a second predictor 201 is added to a first embodiment shown in FIG. 1.

Figure 9:
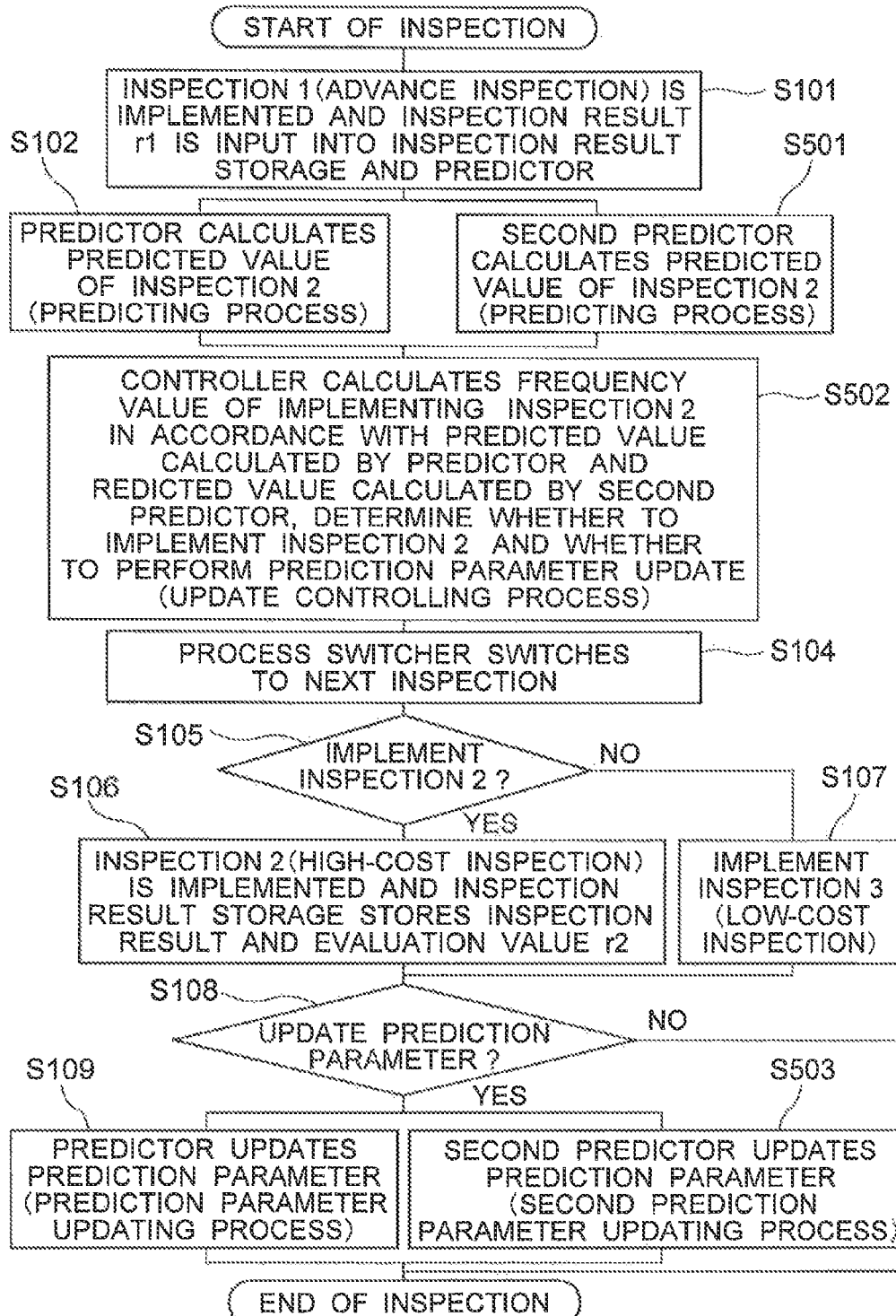
FIG. 9 is a flow chart of a process in the embodiment shown in FIG. 8.

FIG. 9 shows a flow chart of a process in the second embodiment. In the description of processes in the second embodiment, the same processes as those described in the first embodiment will be omitted.

The second predictor 201 includes an updating information filter 202, a second prediction model storage 203, a second inspection 2 result predictor 204, a predicted value storage 205, and a second prediction parameter updator 206. The configuration thereof is the same as the predictor 102 except for the updating information filter 202.

The second predictor 201 is a predictor that makes a prediction on a product satisfying conditions according to specification information through filtering by the updating information filter 202. The specification information represents conditions of the manufacturer of a component used by the product, the gain of an amplifier that reads data, a control setting value such as a flying height of a reading head relative to a storage medium, a place of production where the product was assembled, a situation in assembling, and the like. The specification information may be provided from the inputting device 111 or may be stored in advance inside the device.

The second predictor 201 receives an inspection result value r1 of the inspection 1 that is implemented this time, and calculates a predicted value p2b of the inspection 2 (S501).

In a predicting process inside the second predictor 201, a process similar to that inside the predictor 102 is performed. The second prediction model storage 203 stores prediction parameters used by the second predictor 201 that is different from the prediction parameters used by the predictor 102. The second inspection 2 result predictor 204 calculates the predicted value of the inspection 2 using the prediction parameters and an inspection result value r1b of the limited inspection 1 for the product and calculates a predicted value p2b for the product that satisfies the conditions according to the specification information. The calculation of the predicted value p2b is the same as the calculation method of the predicted value p2 except that prediction parameters to be used differs.

The second predicted value storage 205 stores the predicted value p2b calculated by the second inspection 2 result predictor 204. Note that a value that represents all the predicted values p2b for each product stored in the second predicted value storage 205 is denoted by a predicted value P2B.

The predicting process inside the second predictor 201 is thus completed.

The predicted value p2b calculated by the second inspection 2 result predictor 204 is input into the inspection frequency calculator 108. The inspection 2 frequency calculator 108 calculates a frequency value f2 that is a frequency to implement the inspection 2 based on the predicted value p2 of the inspection 2 result predictor 104, update frequency characteristics information, input from the inputting device 111, to determine an update frequency, and the predicted value p2b of the second inspection 2 result predictor 204 (S502).

Figure 10:
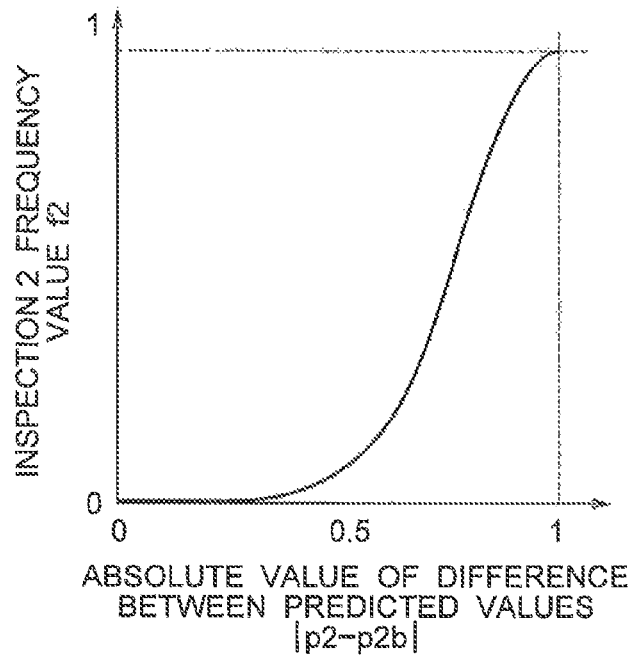
FIG. 10 is a relationship diagram between the absolute value of the difference between two predicted values and the inspection 2 frequency value when the update frequency characteristics information is a normal distribution.

FIG. 10 shows a graph used for calculating the frequency value f2 from the absolute value of the difference between the predicted values p2 and p2b when the update frequency characteristics information is a normal distribution. In this drawing, the frequency value f2 increases as the absolute value of the difference between the predicted values p2 and p2b becomes larger, increasing the possibility of implementing the inspection 2.

As an example of the case of using the second predictor, assume the case where a product that includes only components made by a company A is switched to a new product that includes components made by a company B. It is highly likely that an optimum predicted value P2N for the new product deviates from the existing predicted value P2.

In the case of using only the predictor 102, the frequency value f2 is determined in accordance with the reliability of the predicted value p2. However, in the form where the second predictor is added, by using the predicted value p2 as well as the difference between the predicted values p2b and p2 that is limited to new components made by the company B, it is possible to perform learning focusing on an inspection that is significantly influenced by the components made by the company B, achieving the optimization of prediction for a new product with a smaller number of inspections.

Figure 11:
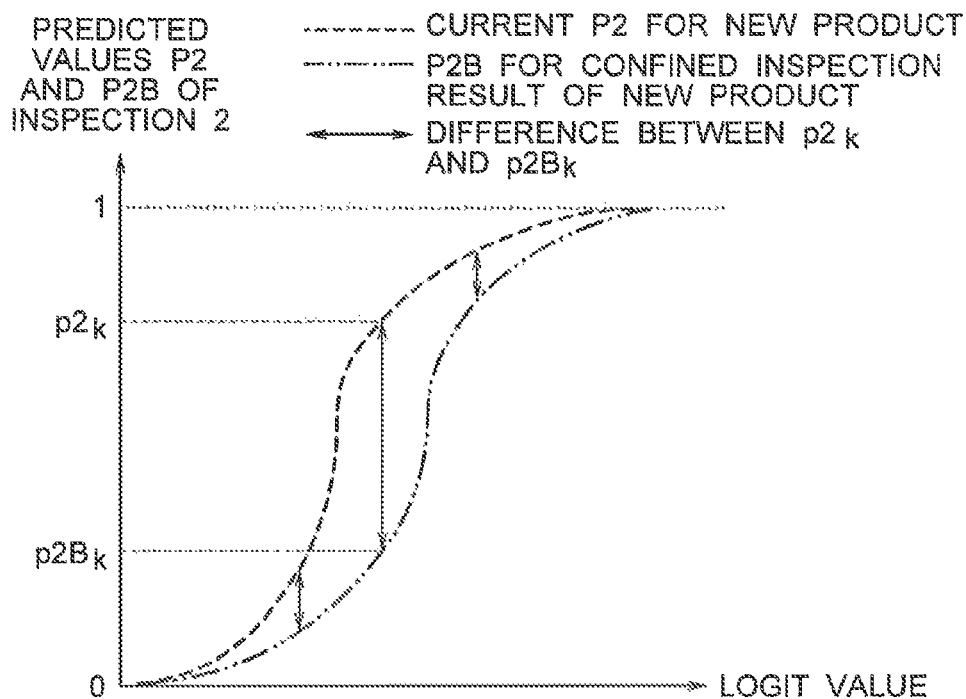
FIG. 11 is a regression model graph indicating a predicted value.

FIG. 11 shows the predicted values P2 calculated thus far by the predictor 102, and the predicted values P2B calculated thus far by the second predictor for a product including components made by the company B product.

A portion where the absolute value of the difference between the predicted values $p2_k$ and $p2b_k$ is large can be considered to be a portion where the current predicted value $p2_j$ significantly deviates from the optimum value $p2B_k$ of the prediction owing to the influence of the new components. Therefore, to implement an inspection focusing on this portion, the update frequency characteristics information is determined, as shown in FIG. 10, such that the frequency value f2 increases as the absolute value of the difference between the predicted values p2 and p2b becomes large. In addition, as with the first embodiment, f2 is made high when the predicted values p2 and p2b are near 0.5.

The second predictor 201 receives the prediction parameter updating signal output from the prediction parameter updating signal creator 110 and calculates a new prediction parameter (S503). The prediction parameter updating signal creator 110 judges the necessity of updating the prediction parameters in a prediction model used by the second predictor by a method similar to that in the first embodiment, and outputs the prediction parameter updating signal if determining the update. Note that the second predictor 201 does not take part in the creation of the prediction parameter updating signal but only receives the prediction parameter updating signal.

Figure 12:
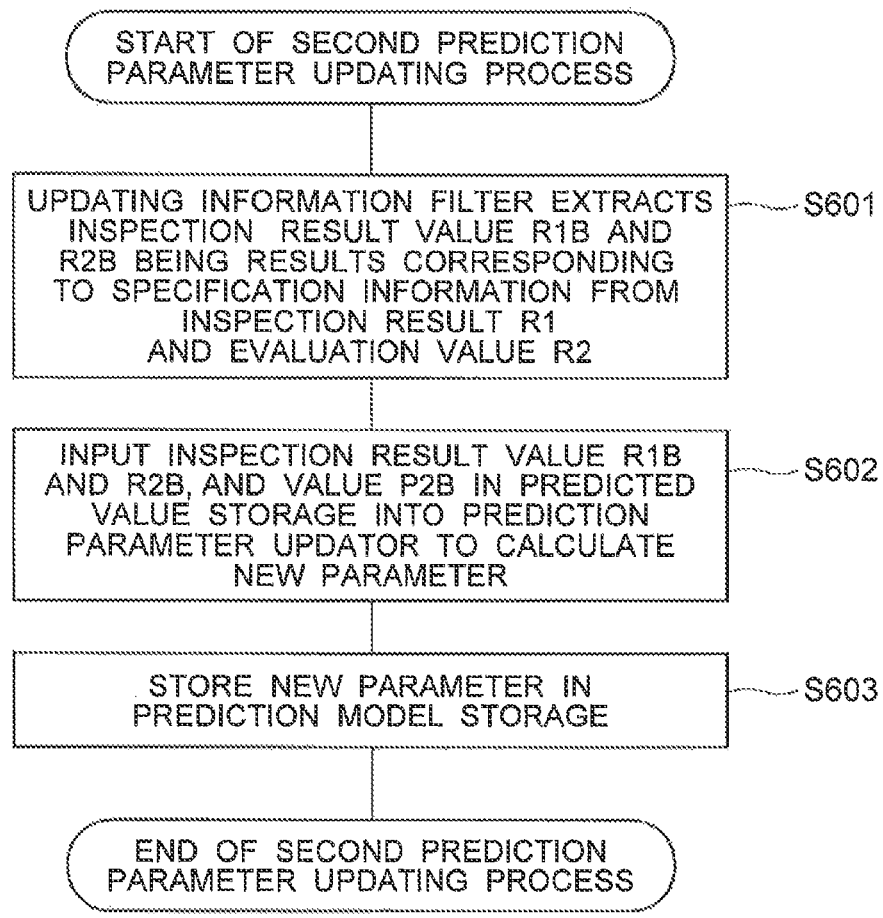
FIG. 12 is a flow chart of an updating process by a second predictor in the embodiment shown in FIG. 8.

FIG. 12 shows a flow chart of an updating process by the second predictor. A second prediction parameter updating process inside the second predictor 201 will be described below.

When the updating information filter 202 receives the prediction parameter updating signal from the prediction parameter updating signal creator 110, the updating information filter 202 extracts, based on the specification information from the inputting device, an inspection result value R1B and an evaluation value R2B for a product that satisfies the conditions according to the specification information from the inspection result value R1 and evaluation value R2 stored in the inspection result storage 101 (S601).

The updating information filter 202 passes the inspection result R1B and the evaluation value R2B to the second prediction parameter updator 206. This process enables the second predictor 201 to make a prediction for a product that satisfies the conditions according to the specification information.

The second prediction parameter updator 206 reads the inspection result value R1B and evaluation value R2B that is confined through the updating information filter, and the predicted value P2B stored in the predicted value storage 205, and calculates new prediction parameters (S602). The calculation method is similar to that in the first embodiment.

The calculated new prediction parameters are stored in the second prediction model storage 203 and used as prediction parameters from the next prediction (S603).

The second prediction parameter updating process inside the second predictor 201 is thus completed.

With the form including two predictors like the second embodiment, it is possible to avoid an unnecessary inspection and to deal with a changeover to a new product with a smaller number of inspections by comparing a normal prediction with a conditioned prediction.

Note that, the present embodiment has a configuration including two predictors, but the number of predictors may be three or more.

Note that the quality controlling devices in the above-described embodiments can be implemented by using, for example, a general-purpose computer device as basic hardware.

Figure 13:
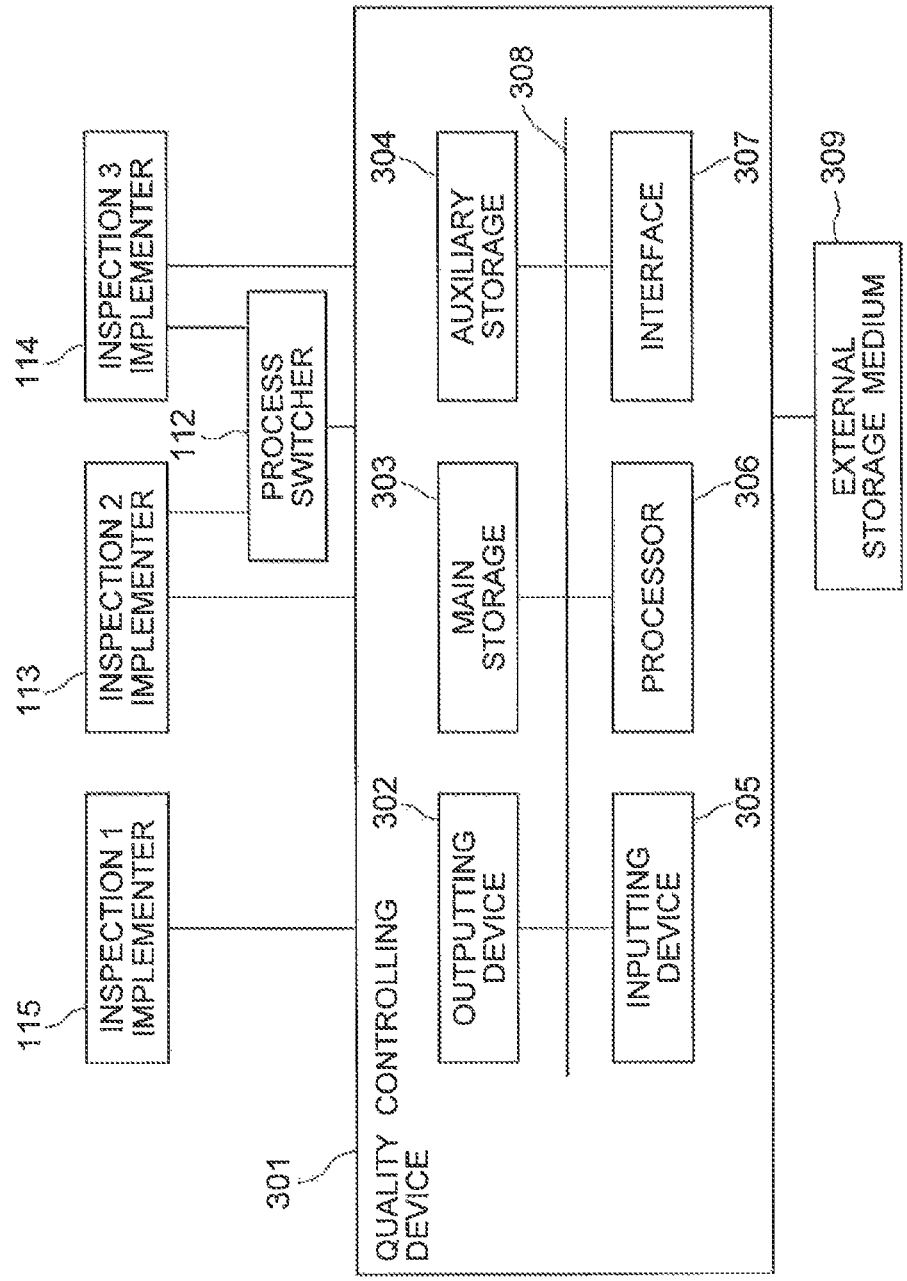
FIG. 13 is a hardware configuration example in one embodiment of the present invention.

FIG. 13 shows a hardware configuration example in one embodiment of the present invention.

The quality controlling device 301 can be implemented as a computer device that includes an inputting device 305, an outputting device 302, a main storage 303, an auxiliary storage 304, a processor 306, and an interface 307, which are connected to one another via a bus 308. The processor 306 reads out a program from the auxiliary storage 304 and expands and executes it on the main storage 303, which can implement the functions of the blocks shown in FIG. 1 or FIG. 8. The quality controlling device may be implemented by installing the above program in the computer device in advance, or may be implemented by storing the above program in a storage medium such as a CD-ROM or distributing the above program over a network, and installing this program on the computer device as appropriate.

The interface 307 is a connection interface or the like that connects an external storage medium 310, a process switcher 311, inspection implementing devices 312, 313, and 314 that implement the respective inspections, and the like. A user inputs information via the inputting device 305. In addition, the outputting device 302 may be a displaying device to display images or a communicating device to transmit data to the outside. The external storage medium 310 may be any recording medium such as an HDD, CD-R, CD-RW, DVD-RAM, and DVD-R.

The main storage 303 is a memory device to temporarily store commands executed by the processor 306, various kinds of data, and the like, and may be a volatile memory such as a DRAM or a nonvolatile memory such as an MRAM.

The auxiliary storage 304 is a storage to permanently store a program, data, and the like, for example, an HDD, SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A quality controlling device comprising:
a hardware storage to store a prediction model associating an inspection result value of a first inspection with a predicted value of a possibility by which a second inspection passes or fails; and
processing circuitry:
to calculate a predicted value of a possibility by which the second inspection passes or fails on an inspection target by calculating the prediction model based on the inspection result value of the first inspection on the inspection target to obtain the predicted value of the prediction model;
to calculate an implementation frequency to implement the second inspection on the inspection target based on the calculated predicted value and a function associating between an implementation frequency and a predicted value; and
to create a signal indicating whether to implement the second inspection, based on the implementation frequency.

2. The device according to claim 1, wherein
the calculated predicted value represents a probability that the inspection target is passed or failed in the second inspection, and
the function returns a largest implementation frequency when the predicted value is a predetermined value and returns an implementation frequency that becomes smaller as an absolute value of a difference between the calculated predicted value and the predetermined value is larger.

3. The device according to claim 2, wherein
the function returns an implementation frequency of a first probability greater than zero if the calculated predicted value is greater than or equal to a lower limit value and less than or equal to an upper limit value, and
the function returns an implementation frequency of a zero probability or an implementation frequency a second probability less than the first probability the predicted value is out of a range between the lower limit value and the upper limit value.

4. The device according to claim 1, wherein
the hardware storage stores an evaluation value indicating pass or failure in the second inspection depending on an inspection result value of the second inspection and store the calculated predicted value,
the processing circuitry determines whether to update the prediction model in accordance with a number of times by which the signal indicating to implement the second inspection is generated for a plurality of the inspection targets, and
the processing circuitry updates the prediction model based on the evaluation value and the calculated predicted value that are stored in the storage, when the processing circuitry determines to update the prediction model.

5. The device according to claim 4, wherein
the prediction model has a first prediction parameter,
the processing circuitry determines a prediction parameter included in a function associating between a predicted value and an evaluation value, on the basis of the evaluation value and the calculated predicted value that are stored in the storage, and
the processing circuitry updates the first prediction parameter in the prediction model by the determined prediction parameter.

6. The device according to claim 4, wherein
the hardware storage stores a second prediction model associating the inspection result value of the first inspection with a predicted value of a possibility by which the second inspection passes or fails, and
the processing circuitry
calculates a predicted value of a possibility by the second inspection passes or fails on a second inspection target by calculating the second prediction model based on the inspection result value of the first inspection on the second inspection target to obtain the predicted value of the second prediction model, and
calculates the implementation frequency based on the calculated predicted value of the prediction model and the calculated predicted value of the second prediction model.

7. The device according to claim 6,
wherein
the hardware storage stores, for second inspection targets, an evaluation value indicating pass or failure in the second inspection depending on an inspection result value of the second inspection and store the calculated predicted value of the second prediction model,
the processing circuitry determines whether to update the second prediction model in accordance with a number of times by which the signal indicating to implement the second inspection is generated for second inspection targets, and
the processing circuitry updates the second prediction model based on the evaluation value and the calculated predicted value for second inspection targets, that are stored in the storage when the processing circuitry determines to update the second prediction model.

8. The device according to claim 6, wherein
the second prediction model has a second prediction parameter,
the processing circuitry determines a prediction parameter included in a function associating between a predicted value and an evaluation value, on the basis of the evaluation value and the calculated predicted value on the second inspection targets that are stored in the hardware storage, and
the processing circuitry updates the second prediction parameter in the second prediction model by the determined prediction parameter.

9. The device according to claim 1, wherein the processing circuitry creates, as the signal indicating whether to implement the second inspection, a signal indicating whether to implement either of the second inspection or a third inspection, a cost of the third inspection being lower than a cost of the second inspection.

10. The device according to claim 9, further comprising a process switcher to output a signal to instruct an implementer that implements the second inspection to implement the second inspection when the signal indicating to implement the second inspection is created, and output a signal to instruct an implementer that implements the third inspection to implement the third inspection when the indicating to implement the third inspection is created.

11. A quality controlling method comprising:
providing a prediction model associating an inspection result value of a first inspection with a predicted value of a possibility by which a second inspection passes or fails;
calculating a predicted value of a possibility by which the second inspection passes or fails on an inspection target by calculating the prediction model based on the inspection result value of the first inspection on the inspection target to obtain the predicted value of the prediction model;
calculating an implementation frequency to implement the second inspection on the inspection target based on the calculated predicted value and a function associating between an implementation frequency and a predicted value; and
creating a signal indicating whether to implement the second inspection, based on the implementation frequency.

* * * * *